Figure 1:
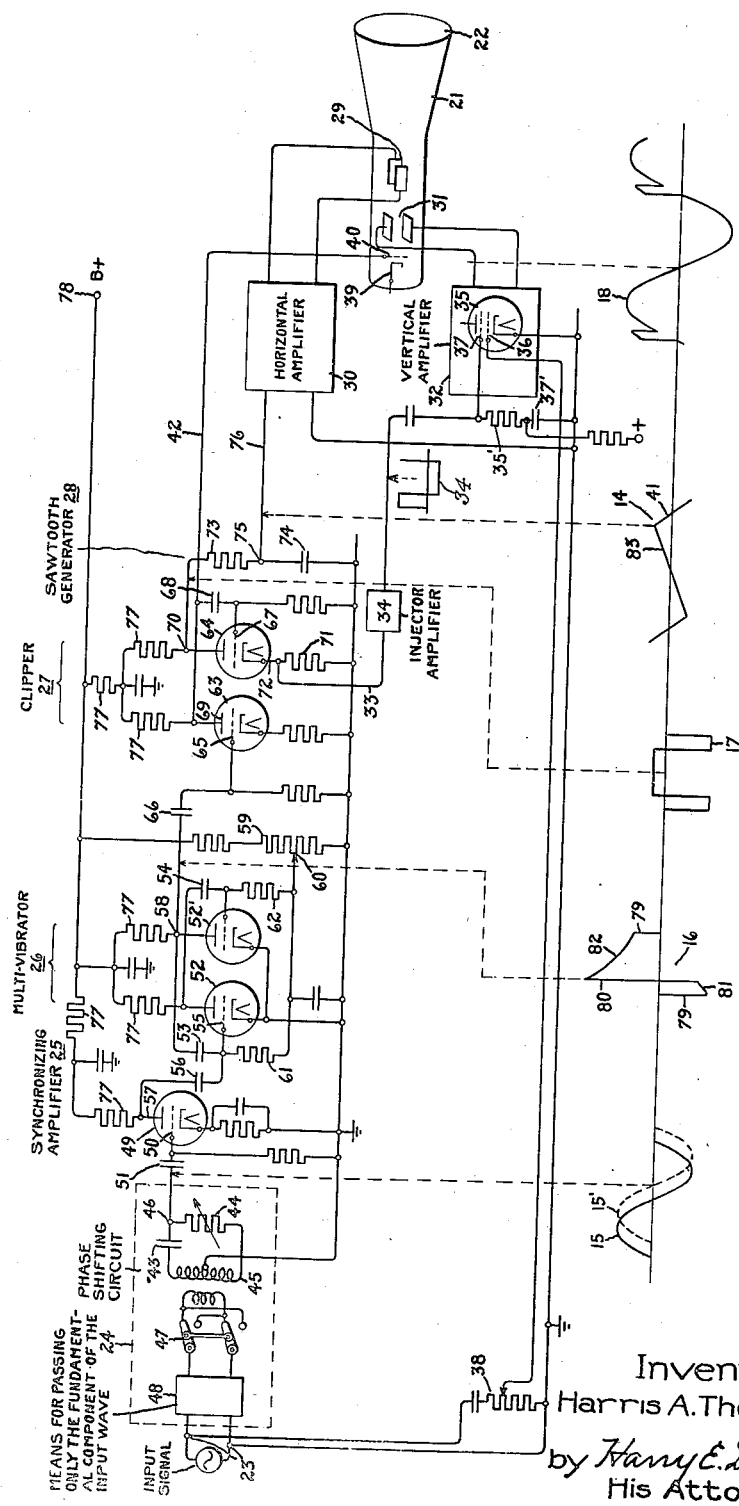

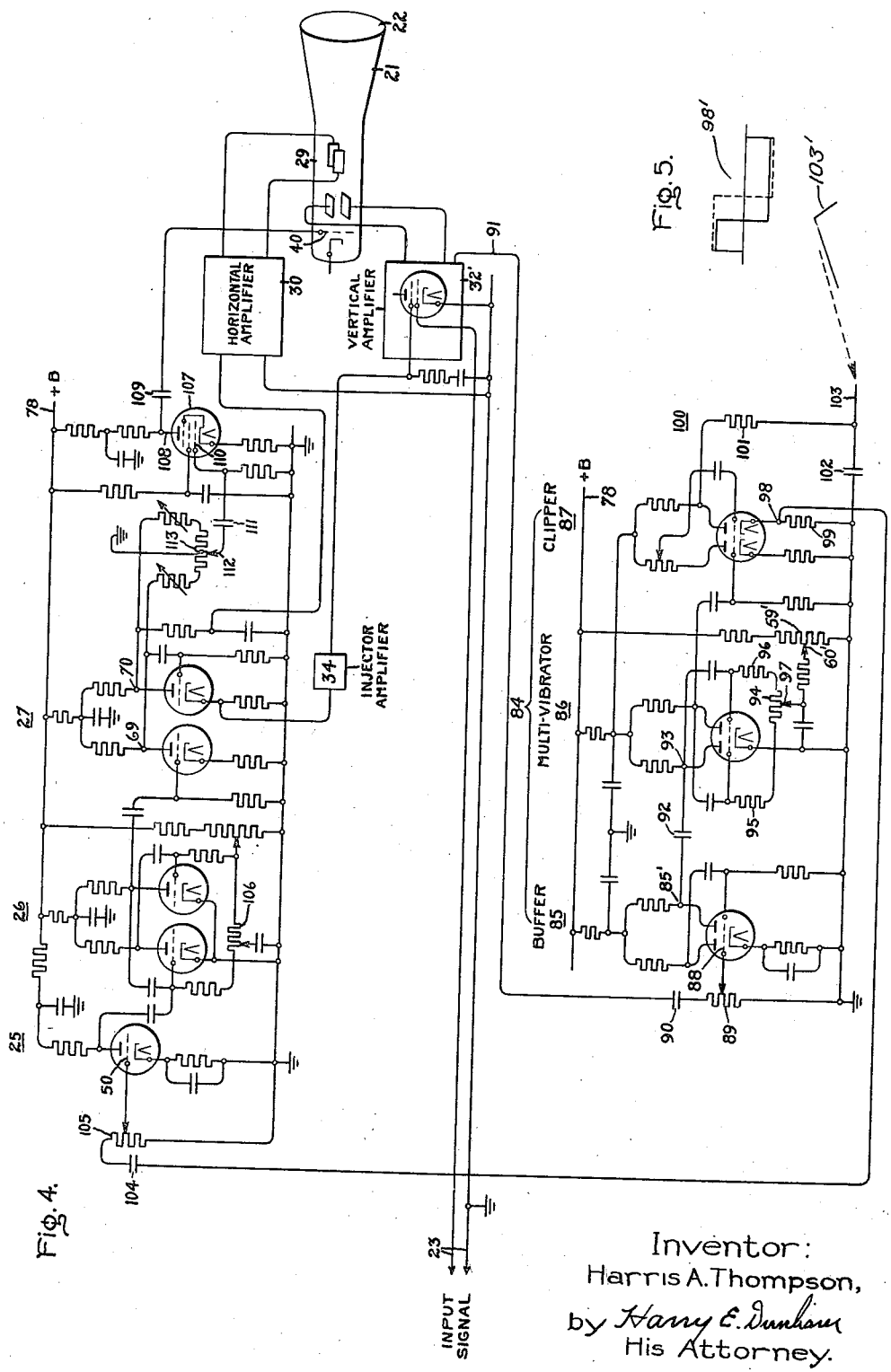

Patented May 8, 1945

2,375,709

UNITED STATES PATENT OFFICE 2,375,709

EXPANSION CIRCUIT FOR OSCILLOSCOPES

Harris A. Thompson, Detroit, Mich., assignor to General Electric Company, a corporation of New York Application August 3, 1940, Serial No. 350,409

16 Claims. (Cl. 315—22)

My invention relates to oscilloscopes and concerns particularly oscilloscopes of the type having a signal-tracing beam, such as cathode ray oscilloscopes, with means for deflecting the beam in a given plane in response to a signal wave to be examined in the oscilloscope and for deflecting the beam in a transverse plane in response to a time-axis or sweep wave.

My invention is a modification of that disclosed in the copending application of Ellsworth D. Cook, filed June 1, 1940, Serial No. 338,360, issue January 30, 1945, as Patent 2,368,448, assigned to the same assignee as the present application relating to an oscilloscope and a sweep wave generator therefor having such a shape of sweep wave that a portion of the signal wave may be considerably expanded, that is, may be made to cover a considerably greater distance along the time axis on the oscilloscope screen than the remainder of the wave.

It is an object of my invention to provide a simplified arrangement for obtaining the expansion of the wave.

It is also an object of my invention to provide an arrangement for increasing the brilliancy of the expanded portion of the wave appearing on the oscilloscope screen.

It is still another object of my invention to provide an improved arrangement for varying the phase relationship of the elements of the sweep wave in order to select the portion of the signal wave to be expanded independently of frequency or wave shape of the signal wave.

Other and further objects and advantages will become apparent as the description proceeds.

In carrying out my invention in its preferred form in connection with cathode ray oscilloscopes having deflection plates for electrostatic deflection of the beam, I provide a discharge tube circuit for producing a triangular sweep wave of voltage for application to the horizontal or sweep plates of the cathode ray oscilloscope and producing also a rectangular voltage wave for injection in the circuit energizing the vertical or signal-responsive deflection plates of the oscilloscope, in order to off-set the expanded portion of the signal wave. I provide a rectangular voltage wave also for application to the control grid of the cathode ray oscilloscope for increasing the fly-back brightness of the beam.

For selecting the portion of the signal wave to be expanded I provide a phase shifting circuit interposed between the signal wave, or a voltage synchronized therewith, and the input electrode of the discharge-tube circuit for producing the triangular voltage wave. The arrangement is such that the return or fly-back portion of the triangular voltage wave is much shorter in its duration than the time for the forward sweep so that the portion of the signal wave occurring during the fly-back interval is greatly expanded and appears in reversed position on the oscilloscope screen. The off-setting voltage serves to separate the expanded portion from the remainder of the wave on the oscilloscope screen to avoid confusion. It will be understood that in the case of oscilloscopes with eelctromagnetic deflection coils, a current of triangular wave shape instead of a voltage is produced in the sweep circuit.

Figure 2:
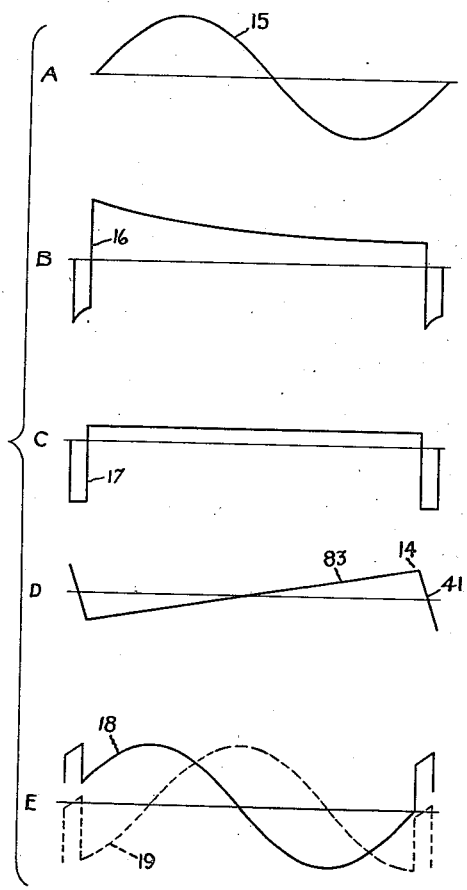
Figure 3:
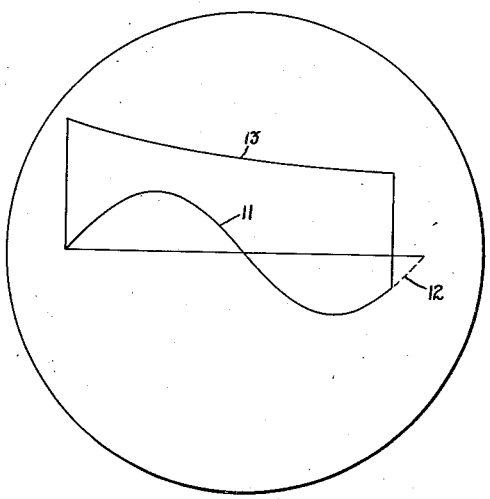

My invention will be understood more readily from the following detailed description when considered in connection with the accompanying drawings and those features of the invention which are believed to be novel and patentable will be pointed out in the claims appended hereto. In the drawings Fig. 1 is a diagram of one embodiment of my invention representing the principal eelctrical circuits and schematically representing various elements of a cathode ray oscilloscope. Fig. 2 is a series of graphs illustrating the principle of my invention. Fig. 3 is a representation of a figure which may be produced by my apparatus on an oscilloscope screen when examining a sine wave, and Fig. 4 is a circuit and schematic diagram of a modification in the arrangement of Fig. 1. Fig. 5 is a graph illustrating the effect of an adjustment in the circuit of Fig. 4. Like reference characters are utilized throughout the drawings to designate like parts.

Referring to Fig. 3 there will be seen a sine wave 11 with the end portion 12 thereof dotted. Corresponding to the dotted portion 12 there is an expansion thereof 13 of the same length as the remainder of the sine wave 11, but off-set therefrom and reversed in direction of horizontal progression. In the case of irregular wave shapes it may be highly desirable to expand some particular portion of the wave, such as the portion 12, for more precise examination. Such expansion and reversal of the portion 12 of the wave to produce the segment 13 is accomplished in my apparatus by producing a sweep voltage wave 14 of the shape shown in curve D of Fig. 2. In order that the segment 13 of the wave will not be diminished in brightness by its increased speed across the oscilloscope screen, a brightness-increasing voltage is applied to the control electrode of the oscilloscope tube in a manner which will be described hereinafter. To permit expanding any selected portion of the wave 11 to be examined, the phase relationship between the sweep wave 14 and the signal wave is varied in a manner which will also be described hereinafter.

The signal wave or the sine wave fundamental thereof, if the signal wave is not a sine wave, may be represented by the sine wave 15 constituting the curve A of Fig. 2. The sweep wave is produced by first producing an irregular wave 16 with steep-sided loops, as shown in curve B of Fig. 2, which wave may be adjusted in frequency in order to correspond in frequency to the signal wave so that it may be synchronized therewith. The irregular wave 16 is then converted into a rectangular wave 17, constituting the curve C of Fig. 2, and the rectangular wave 17 is converted into a triangular wave 14, curve D. In order to off-set the expanded portion of the wave 12 from Fig. 3, a rectangular wave synchronous with the triangular wave is injected in the vertical amplifier for producing the signal wave so that the voltage applied to the signal deflection plates is as represented in curve 18 in graph E of Fig. 2. The rectangular wave injected in the vertical amplifier is of the opposite polarity from the rectangular wave 17, if the expanded portion of the wave is to be off-set in the positive direction and may be of the same polarity if the expanded portion is to be offset in the negative direction. By varying the phase relationship between the sweep wave 14 and the signal wave 15, any desired portion of the signal wave may be off-set and expanded, as illustrated in the dotted curve 19 of graph E, Fig. 2, in which for convenience the phase angle of the signal wave is shown as varied while the phase angle of the sweep wave is the same as for the other graphs of Fig. 2.

Referring to Fig. 1 there is illustrated a cathode ray oscilloscope tube 21 having a screen 22 in which the wave shape of an input signal applied at terminals 23 is to be examined. Responsive to the input signal 23 there is apparatus shown within the dotted rectangle 24 for varying the phase relationship of the fundamental component of a voltage reproducing the input signal. The output voltage of the phase shifting circuit 24 is supplied to a synchronizing amplifier 25, the output of which in turn controls and synchronizes a multi-vibrator circuit 26 for producing the irregular wave 16. The irregular wave 16 is fed to a clipper circuit 27 to produce a rectangular output wave 17 and the output of the clipper circuit is applied to a saw tooth generator circuit to provide a triangular wave 14. The output of the saw tooth generator 28 is connected to the sweep wave circuit of the oscilloscope 21. The oscilloscope 21 is illustrated as being of the electrostatic beam-deflection type and thus the sweep-deflection circuit includes a pair of horizontal-deflection plates 29. The extension to the magnetically deflected oscilloscope is obvious to one skilled in the art. Preferably a horizontal amplifier 30, which may be of conventional type, is interposed in the horizontal-deflection circuit.

The input signal is applied to the vertical deflection circuit including signal- or vertical-deflection plates 31, preferably also through an amplifier 32 represented schematically by the rectangle bearing the legend, "Vertical Amplifier." For off-setting the portion of the wave which is to be expanded, a connection 33, preferably through an injector amplifier 34, is made between a suitable portion of the rectangular-wave generator or clipper circuit 27 and a suitable electrode provided in the vertical amplifier 32. The vertical amplifier 32 may be of the conventional type consisting of one or more stages of vacuum tube circuits except that it includes suitable means for adding together two input voltages. Such adding means may take the form of a mixer tube 35, forming one stage, preferably the initial stage of the vacuum tube amplifier circuit. The power supply and output connections for the tube 35 are not shown since it will be understood that these are the same as in conventional vacuum-tube amplifiers. The mixer tube 35 has two control electrodes 36 and 37 to which the input signal derived from the terminals 23 and the rectangular wave from the connection 33 are applied respectively.

The mixer tube 35 may be a tetrode in which the control electrode 36 constitutes the usual control grid, and the control electrode 37 constitutes the usual screen grid. In this case, it is desirable to apply a voltage of sufficient amplitude to the screen 37, and it is therefore advantageous to have the injector amplifier 34 interposed in the connection 33 if the off-setting wave is applied to the screen 37. If such an injector amplifier is not employed, it may be preferable to apply the input signal to the screen 37 and the off-setting wave to the grid 36 or in some other well known manner. In the arrangement illustrated, it may be desirable to provide a volume control 38 to permit adjusting the strength of the input signal applied to the vertical amplifier 32. A decoupling or by-pass condenser 37' may be connected between ground and the screen 37 through a relatively low-resistance resistor 35 in order not to short circuit the off-setting wave.

The cathode ray oscilloscope tube 21 is of the well known type including in addition to the deflection plates 29 and 31, a cathode 39, an anode not shown, and a control electrode 40 for controlling the intensity of the beam. In order to increase the strength of the beam during the quick return or fly-back period 41 of the saw tooth sweep wave 14 for maintaining the apparent brilliancy of the extended segment 13 of the signal curve on the oscilloscope screen in spite of the increased speed of the beam during the fly-back period, the voltage supply for the cathode ray tube control electrode 40 is so arranged as to be increased during the fly-back period. This may be accomplished by means of a connection 42 to a point in the rectangular wave generator or clipper circuit 27 on which a short positive pulse appears during the fly-back period, as will be explained more in detail hereinafter. For the purpose of maintaining the control electrode 40 sufficiently high in potential with respect to the cathode 39, the conventional power supply for the tube 21, not shown, may be so arranged as to supply a voltage to the cathode 39 which is sufficiently negative with respect to the ground connections shown for the square wave generator 27.

The phase shifting circuit indicated in the dotted rectangle 24 may be of any suitable type. The specific arrangement illustrated in Fig. 1 for phase-shifting a voltage that can be synchronized with the signal wave, not being my invention per se, need not be described at length. It consists of a conventional condenser-rheostat type of phase shifter including a condenser 43 connected in series with a rheostat 44 across the secondary winding 45 of a transformer. The common terminal 46 of the condenser 43 and the rheostat 44 serves as the output terminal of the phase shifter circuit 24 for connection to the synchronizing amplifier 25, and the mid point of the transformer winding 45 is connected to the same ground connection as the synchronizing amplifier 25. A polarity-reversing switch 47 may be provided to extend the range of the phase shifter from 180 to 360 degrees and if the wave shape of the input signal is liable to be too distorted to permit effective operation of a simple form of condenser-rheostat phase-shifter 43—44, suitable means for extracting the sine-wave fundamental such as a filter 48 may be interposed between the polarity reversing switch 47 and the input terminals 23 to which the input signal, or a fraction thereof is connected.

The synchronizing amplifier 25 may be any suitable amplifier of conventional design. The form shown is a conventional triode amplifier including a three-element discharge device 49 having its control electrode 50 coupled to the output terminal 46 of the phase shifting circuit 24 through a coupling condenser 51.

The multi-vibrator circuit 26 comprises a pair of triodes 52 and 52', each having its anode coupled to the control electrode of the other through one or the other of the coupling condensers 53 and 54. A control electrode 55 of one of the tubes 52 is coupled by means of a coupling condenser 56 to the anode or output terminal 57 of the synchronizing amplifier 49. The anode connection 58 of the other triode 52' serves as the output terminal of the multi-vibrator 26. For permitting adjustment of the frequency of the wave 16 produced by the multi-vibrator 26, a potentiometer 59 is provided having an adjustable tap 60 to which the control electrodes of the tubes 51 and 52 are connected through grid leak resistors 61 and 62, respectively. The relative values of the resistances in the resistors 61 and 62 are chosen to give the desired ratio between the positive and negative pulse widths of the wave 16.

The clipper circuit 27 comprises a pair of vacuum tubes 63 and 64 with the control electrode 65 of the first vacuum tube 63 coupled through a coupling condenser 66 to the anode terminal 58 of the tube 52, the terminal 58 being the output of the multi-vibrator 26. The control electrode 67 of the clipper tube 64 is coupled through the coupling condenser 68 to the anode 69 of the first clipper tube 63, and the anode connection 70 of the second tube 64 serves as the output terminal of the clipper circuit 27. In order to provide a rectangular wave of opposite polarity from the wave appearing at the terminal 70, a resistor 71 may be connected in the cathode lead of the tube 64 with the injector or off-setting voltage connection 33 being taken from the cathode 72 of the second clipper tube 64. The fly-back brightness control through the connection 42 may be taken from the anode 69 of the first tube 63.

The saw tooth generator circuit 28 consists of a resistor 73 connected in series with a condenser 74 across the anode-cathode circuit of the second clipper tube 64, the resistor 73 being connected to the clipper tube anode 70, and the condenser 74 being connected to ground, with the common terminal 75 serving as the saw-tooth wave output terminal connected through a conductor 76 to the input terminal of the horizontal amplifier 30. The vacuum tube circuit 25—27, inclusive, is shown with resistance coupling, and accordingly suitable anode resistors 77 of proper individual values are connected in the anode leads.

Suitable sources of plate voltage and heater current are provided for the discharge tubes specifically shown and for the amplifiers 30, 32 and 34. However, since these arrangements are well known in the art they need not be illustrated. The connection to the positive terminal of the source of plate voltage is represented by the terminal 78. Although triodes have been illustrated for the sake of simplicity in the drawings, it will be understood that my invention does not exclude the use of multi-electrode tubes, where they may be advantageous in accordance with the practice of those skilled in the art. Various conventional features of the circuits such as grid-leak resistors, stabilizing negative feed-back resistors in the cathode leads, by-pass condensers, and ripple-absorbing condensers across the anode circuits, have been illustrated without specific mention, as these are not distinctive features of my invention and their use is according to well-known principles.

The principle of operation of the circuits is represented by the series of characteristic curves reproduced along the lower margin of Fig. 1 with the arrows pointing to the points in the circuit at which the characteristic curves are produced. The curve 15 represents an input signal or a fundamental sine wave component thereof, and the curve 15' represents the corresponding curve shifted in phase by means of the phase shifting circuit 24.

The voltage 15' is amplified by the synchronizing amplifier 25 and is applied to the control electrode 55 of the multi-vibrator tube 52. This multi-vibrator is adjusted to have almost the same fundamental frequency as that of the wave applied from the synchronizing amplifier 25. When the sum of the potentials on the control electrode 55 passes through a critical potential, conduction current is allowed to flow in the anode circuit of tube 52 of multi-vibrator 26 lowering the anode potential and thereby driving the control electrode of tube 52' past cut-off of anode current abruptly and causing the anode potential of tube 52' to rise abruptly as represented by one of the vertical lines, such as the vertical line 80 in the multi-vibrator output curve 16. The current shift takes place abruptly since each control grid of the multi-vibrator is tied through the condensers 53 and 54 to the anode of the other tube. The grid condensers 53 and 54 thereupon have charges representing a state of unstable equilibrium and tend to discharge along curves of well-known form until the control electrode of the then non-conducting tube 52' passes through that grid potential corresponding to cut-off of plate current, the said change of grid potential being in positive direction whence the action is shifted to that tube and the process continues, shifting abruptly from one tube to the other continuously as illustrated by curve 16. The vertical line 79 represents the abrupt drop in anode potential of the tube 52' when that tube takes current. The portions 81 and 82 of the curve 16 represent the effect of the discharge curves of the condensers. In the absence of synchronizing voltage 15, the shifting of current from one tube to the other takes place repeatedly at a frequency determined by the setting of the tap 60, higher frequency being produced by raising the average potential of the tap 60 and lower frequency being produced by lowering the potential of the tap 60. However, if the frequency is set relatively close to the frequency of the input signal tied to the multi-vibrator 26 through the coupling condenser 56, the oscillations of the multi-vibrator will be synchronized with the input signal so that the current shifts take place at a predetermined point in the input signal wave.

The relationship between the resistances of the resistors 61 and 62 is made such that the negative pulse width, that is, the horizontal distance along the time axis of the portion 81 of the curve 16, is made relatively small in the comparison with the positive pulse width, the width of the portion 82 in order that the fly-back portion 41 of the sweep wave will be steep, representing rapid beam movement to give a large expansion of the portion of the signal wave to be examined in detail.

The characteristics of the clipper tubes 27 are such that the minimum voltage along parts 81 and 82 in either loop of the wave 16 exceeds the cut-off voltage of the clipper tube so that these parts are cut-off and the resultant amplified voltage appearing at the terminal 70 is rectangular, as shown by the curve 17. It will be understood that one clipper tube cuts off one half of the loop 16 and the second tube cuts off the other half.

The resistor 73 of the saw tooth generator 28 has a resistance which is relatively large in relation to the capacitance of the condenser 74 so that the current flowing through the resistor 73 is substantially proportional to the potential of the terminal 70, regardless of the frequency or steepness of the wave front of the potential. The condenser 74, however, has an integrating effect and the rectangular wave 17 is converted into a saw tooth or triangular wave 14. Looked at another way, since the rectangular wave 17 produces constant voltage of one polarity at the terminal 70 alternating with constant voltage of the opposite polarity and resistance 73 predominates by a large margin in circuit 73—74, the current in the resistor 73 remains constant as long as it continues with one polarity, causing the condenser charge and potential difference across it to vary at a uniform rate, but owing to the difference in heights of the positive and negative loops from the average value of the rectangular wave 17, the magnitude of the charging current is considerably greater during the short negative pulse than during the longer positive pulse. Consequently, the voltage in the wave 14 builds up gradually at a uniform rate, and falls off again uniformly at a quicker rate to produce a substantially perfect triangular or saw-tooth wave which is applied to the horizontal plates 29 through the horizontal amplifier 30. In the portion 83 of the triangular wave 14, the cathode ray beam is swept forward at a uniform rate to produce the principal portion of the signal wave on the cathode ray screen 22 and during the quick return portion 41 of the triangular wave 14, the cathode ray beam is swept back more rapidly, but also at a uniform rate to produce the expanded segment 13 of the signal wave (Fig. 3). The wave 14, being triangular, has two portions of different slope, the portion 83 being shown with positive slope and the portion 41 with negative slope.

I have described and illustrated the use of the multi-vibrator circuit with clippers and the sawtooth circuit for producing a triangular sweep wave, because such a circuit is particularly well adapted for working in the high frequency limit of the sweep circuits. My invention, however, is not limited to the specific arrangement illustrated and obviously does not exclude the use of a gas discharge tube to create the necessary triangular or saw-tooth wave.

Since in vacuum tube circuits, the plate polarity reverses from one stage to the next, a short negative voltage pulse on the anode connection 70 of the clipper tube 64 occurs simultaneously with a short positive pulse on the anode 69 of the preceding clipper tube 63. By reason of the connection 42 from the clipper-tube anode 69 to the control electrode 40 of the cathode ray tube 21, the beam intensity of the cathode ray tube is increased during the short pulse when the beam is being swept back rapidly to produce the expanded portion of the signal wave. Likewise, since the anode voltage of the discharge tube is at a minimum when the anode current is at a maximum, the voltage across the resistor 71 in the cathode circuit of the clipper tube 64 is at a maximum during the short pulses, and a rectangular wave 34' with short-pulse positive-voltage is injected in the vertical amplifier 32 during the period when the beam is being swept back rapidly for expansion. Assuming that the amplifier has such a number of stages as to reproduce the input polarity, the expanded portion of the wave is off-set in the upwards or positive direction. By a change of connections the expanded portion of the wave could also be off-set in the opposite direction.

In the arrangement illustrated in Fig. 4 the general features of the circuit shown in Fig. 1 are employed with certain refinements. The phase shifter circuit 24 of Fig. 1 is replaced by a modified form of phase shifter circuit 84 shown in the lower half of sheet 2, which is capable of producing a time delay of substantially any desired portion of the period of the signal between the signal wave and the sweep wave, regardless of the wave shape or frequency of the signal wave, or the availability of a substantially sine wave which can be synchronized with the signal wave. The phase shifting circuit 84 illustrated in Fig. 4 comprises a discharge tube circuit which may employ conventional vacuum tubes including one or more buffer stages or synchronizing amplifier stages 85, a multi-vibrator circuit 86, and a clipper circuit 87, with resistance-capacitator coupling between stages. The buffer 85, as illustrated, comprises two stages similar to the synchronizing amplifier 25 illustrated in Fig. 1 with the control electrode 88 of the first stage connected through a volume control 89 and a coupling condenser 90 to a source of synchronizing voltage which may be the signal wave itself or a voltage proportional thereto. In the arrangement illustrated, a modified form of vertical amplifier 32' is indicated with a connection 91 providing the synchronizing voltage. It will be understood that the connection 91 is merely brought out in the conventional manner from some suitable point in one of the stages of the vertical amplifier 32' at which a voltage appears, corresponding to the input signal voltage wave.

The multi-vibrator 86 is similar in principle of operation to the multi-vibrator 26 previously described, with the synchronizing connection from the synchronizing amplifier 85 being made in this case, however, by means of a coupling condenser 92 joining the output terminal 85' of the buffer 85 and the first anode 93 of the multi-vibrator 86 which is capacitively coupled to the grid of the other half of the multi-vibrator. Twin triodes are illustrated in the phase shifting circuit 84 but it will be understood that these are the equivalent of separate tubes. The multi-vibrator 86 has an additional potentiometer 94 provided between the grid-leak resistors 95 and 96 in order that the relative pulse widths of the multi-vibrator 86 may be adjusted. If the tap 97 of the potentiometer 94 is in one extreme direction the positive pulses are made very long in the direction of the time axis and the negative pulses are made very short, and vice versa if the tap 97 is moved to the other extreme direction. An additional potentiometer 59' is connected across the (+) B supply so that the fundamental frequency of multi-vibrator 86 may be adjusted by moving a tap 60'.

The clipper circuit 87 is also similar in principle of operation to the clipper circuit 27 previously described, with a connection 98 being made to the second cathode at the upper end of a cathode resistor 99 so that a rectangular wave appears on the connection 98. A saw-tooth generator circuit 100 consisting of a resistor 101, and a condenser 102 connected in series across the output of the clipper tube 87 and having an output conductor 103, may be provided for furnishing a saw-tooth wave 103' for any purpose for which such a wave may be desired, corresponding in time division of the various parts of its cycle to the rectangular wave output of the clipper 87.

The connection 98 is brought to the control electrode 50 of the synchronizing amplifier 25 through a coupling condenser 104 and a volume control 105, so that a synchronizing pulse amplified by the amplifier 25 occurs at the frequency determined by the frequency of the rectangular wave produced by the circuit 84, but the instant in each cycle of the output wave of the circuit 84 at which the sweep wave is initiated in the multi-vibrator 26 is determined by the relative time allotted by adjustment of 97 to the negative pulse out of the complete cycle as shown in Fig. 5. The synchronizing of multi-vibrator 26 through its synchronizing amplifier 25 is therefore determined by the instant within the cycle at which the polarity of the pulse changes from positive to negative in the rectangular output wave 98' (Fig. 5) of the phase shifter circuit 84. This instant, in turn, is determined by the length of the positive pulse. The pulse with adjustment by means of the tap 97 of the multi-vibrator 86, accordingly, serves as the phase shifting adjustment for the sweep wave generator shown in the upper half of Fig. 4. Since this depends merely on changing the relative length of the positive and negative loops of the rectangular wave provided by the phase shifting circuit 84, it is independent of the wave shape of the input signal. In Fig. 5, the full lines represent the wave produced with one setting of the potentiometer 94, and the dotted lines represent the wave produced with another setting.

If desired, a pulse width adjusting potentiometer 106 may be provided in the multi-vibrator 26 in order to permit varying the length of the portion of the input signal which is expanded by varying the relative lengths of the positive and negative pulses provided by the multi-vibrator 26 which, in turn, determines the relative duration of the ascending and descending portions of the saw-tooth wave 14.

If desired, also an additional vacuum tube stage may be provided for controlling the fly-back brightness, and the arrangement may be such that the fly-back brightness may be adjusted. For this purpose a beam-brightness control tube 107 may be provided which is shown as a pentode with an anode 108 connected through a coupling condenser 109 to the control electrode 40 and necessary resistors not shown, of the oscilloscope tube 21, and with a control electrode 110 connected through a coupling condenser 111, to an adjustable tap 112 of the potentiometer 113, which is connected between the anodes 69 and 70 of the clipper 27. Since two clipper tubes 69 and 70 are available, the plate potentials vary in opposite directions and a rectangular wave of adjustable amplitude but with the same pulse width as the saw-tooth wave supplied to the sweep plates 29 may be obtained by adjustment of the tap 112. The rectangular wave appearing at the tap 112, in turn, controls the output of the brightness-control tube 107 in order to adjust the magnitude of the control electrode voltage of the oscilloscope tube 21 in accordance with the length and frequency of the fly-back portion of the wave 41.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A sweep wave generator for an oscilloscope producing a signal-tracing beam and having sweep and signal deflection circuits, said sweep wave generator comprising a synchronizing amplifier with means for controlling it by a voltage in synchronism with the signal wave to be examined in the oscilloscope, a multi-vibrator controlled by the synchronizing amplifier and including adjusting means for causing the multi-vibrator to produce a wave adjustable in frequency and pulse width, a clipper connected to the multi-vibrator for converting the multi-vibrator wave into a rectangular wave, a saw-tooth circuit for converting the rectangular wave into a triangular wave, means for adjustably shifting the phase of the triangular wave in relation to the signal wave, means for supplying a voltage synchronized with the rectangular wave to the oscilloscope for increasing the fly-back brightness of the oscilloscope beam, means for adjusting the magnitude of said voltage, and means for injecting a rectangular wave in the signal deflection circuit of the oscilloscope in synchronism with the triangular wave, whereby a portion of the signal wave is produced on the oscilloscope screen in expanded form reversed with respect to the remainder of the wave and off-set therefrom.

2. A sweep-wave generator for an oscilloscope having sweep and signal deflection circuits and a beam-brightness determining electrode, said sweep wave generator comprising means for producing a rectangular wave, means for synchronizing said wave with the wave of the signal to be examined in the oscilloscope, and means for varying the phase relationship between the rectangular wave and the signal wave, means for converting the rectangular wave into a triangular wave, means for applying the triangular wave to the sweep deflection circuit of the oscilloscope, means for applying a voltage synchronized with said rectangular wave to the beam-brightness determining electrode of the oscilloscope, and means for injecting a rectangular wave synchronized with said first-mentioned rectangular wave in the signal deflection circuit of the oscilloscope, whereby a portion of the signal wave is produced on the oscilloscope screen in expanded form reversed with respect to the remainder of the wave and off-set therefrom.

3. A sweep wave generator combination for an oscilloscope having sweep and signal deflection circuits for the oscilloscope beam, and an electrode for determining the brightness of the oscilloscope beam, said sweep wave generator combination comprising means for producing a triangular sweep wave having an amplitude representing the length of the time or sweep axis, having a forward portion and having a return portion which is shorter than the forward portion, means for synchronizing the triangular wave with a voltage which is in synchronism with the signal wave to be examined in the oscilloscope, means for applying the triangular waves to the sweep deflection circuit of the oscilloscope, and means for varying the phase relationship between the triangular wave and said last-mentioned voltage, means for supplying a voltage of increased value to the beam-brightness determining electrode of the oscilloscope during the return portion of the triangular wave, whereby the beam brightness during the return interval of the beam is maintained comparable with the brightness during the advancing portion of the wave produced on the screen of the oscilloscope, and the return sweep of the beam represents in reverse an expansion of a portion of the signal wave.

4. In a sweep wave generator for a sectional wave expansion type oscilloscope including means for producing a triangular sweep wave, said means having a synchronizing electrode to which may be applied a voltage in synchronism with the signal wave to be examined in the oscilloscope, a synchronizing terminal with means for energizing it synchronously with the signal wave a phase shifter interposed between said synchronizing terminal and the synchronizing electrode of said triangular wave generating means, said phase shifter comprising a synchronizing amplifier connected to said synchronizing terminal, a multi-vibrator controlled by the output of the synchronizing amplifier and having adjusting means for producing a peaked wave adjustable in frequency and adjustable in relative length of the positive and negative pulses, a clipper connected to the multi-vibrator for converting the multi-vibrator wave into a rectangular wave, and means for supplying the rectangular wave to the synchronizing electrode of the triangular-wave generating means to serve as a synchronizing pulse, whereby the adjustment of the pulse width varies the instant of initiation of the synchronizing pulse produced by the phase shifter without varying the frequency thereof in order that any portion of the signal wave may be expanded with respect to the remainder of the signal wave.

5. A sweep wave generator combination for an oscilloscope having a sweep deflecting circuit for the oscilloscope beam, and an electrode for determining the brightness of the oscilloscope beam, said sweep wave generator combination comprising means for producing a triangular sweep wave having a forward portion, and a return portion which is shorter than the forward portion, and means for supplying a voltage of increased value to the beam-brightness determining electrode of the oscilloscope during the return portion of the triangular wave, whereby the beam brightness during the return interval of the beam is maintained comparable with the brightness during the advancing portion of the wave produced on the screen of the oscilloscope, and the return sweep of the beam represents in reverse an expansion of a portion of the signal wave.

6. A sweep wave generator combination for an oscilloscope having a sweep deflecting circuit for the oscilloscope beam, said sweep wave generator combination comprising means for producing a triangular sweep wave having a forward portion of amplitude corresponding to the desired length of time axis and having a return portion of the same amplitude but which is shorter in time duration than the forward portion, means for synchronizing the triangular wave with a voltage which is in synchronism with the signal wave to be examined in the oscilloscope, and adjustable means for varying the phase relationship of the short return portion of the triangular wave with the signal to be examined, whereby the return sweep of the beam produces in reverse an expansion of a portion of the signal wave, and the portion to be expanded may be selected by adjustment of the said phase varying means.

7. A sweep wave generator for an oscilloscope producing a signal-tracing beam and having sweep and signal deflection circuits, said sweep wave generator comprising a synchronizing amplifier with means for controlling it by a voltage in synchronism with the signal wave to be examined in the oscilloscope, a multi-vibrator controlled by the synchronizing amplifier and having adjusting means for producing a wave adjustable in frequency and pulse width, a clipper connected to the multi-vibrator for converting the multi-vibrator wave into a rectangular wave, a saw-tooth circuit for converting the rectangular wave into a triangular wave, means for adjustably shifting the phase of the triangular wave in relation to the signal wave, and means for injecting a rectangular wave in the signal deflection circuit of the oscilloscope in synchronism with the triangular wave, whereby a portion of the signal wave is produced on the oscilloscope screen in expanded form reversed with respect to the remainder of the wave and off-set therefrom.

8. A sweep wave generator combination for an oscilloscope producing a signal-tracing beam and having sweep and signal deflection circuits, said sweep wave generator combination comprising a generator of a triangular wave which thus has two portions of different slopes, the wave amplitude representing the time axis of the oscilloscope, one wave portion being steeper than the other, means for adjustably shifting the phase of the triangular wave in relation to the signal wave, a generator of a rectangular wave having a pulse length equalling the length of the steeper portion of the triangular wave and synchronized therewith, and means for injecting the rectangular wave in the signal deflection circuit, said oscilloscope being capable of producing a signal-tracing beam of sufficient strength to produce a trace on the oscilloscope screen at the sweep speed produced by the steeper slope portion of the triangular wave, whereby a portion of the signal wave is produced on the oscilloscope screen in expanded form reversed with respect to the remainder of the wave and off-set therefrom.

9. A sweep wave generator combination for an oscilloscope producing a signal-tracing beam and having sweep and signal deflection circuits, said sweep wave generator combination comprising a generator of a triangular wave with forward and return sweep portions, the wave having an amplitude representing the length of the time axis of the oscilloscope, one of said portions being steeper than the other, a generator of a rectangular wave having a pulse length corresponding to the length of the steeper slope portion of the triangular wave and synchronized therewith, and means for injecting the rectangular wave in the signal deflection circuit, whereby a portion of the signal wave is produced on the oscillscope screen in expanded form reversed with respect to the remainder of the wave and off-set therefrom.

10. A sweep wave generator combination for an oscilloscope producing a signal-tracing beam and having sweep and signal deflection circuits, said sweep wave generator combination comprising a generator of a triangular wave having forward and return sweep portions, one of which is steeper in slope than the other, the triangular wave having an amplitude representing the length of the time axis of the oscilloscope, means for adjustably shifting the phase of the triangular wave in relation to the signal wave, whereby a portion of the signal wave is produced on the oscilloscope screen in expanded form reversed with respect to the remainder of the wave.

11. A sweep wave generator combination for an oscilloscope having sweep and signal deflection circuits and a beam-brightness determining electrode, said sweep wave generator combination comprsing means for producing a rectangular wave, means for synchronizing said wave with the wave of the signal to be examined in the oscilloscope, means for converting the rectangular wave into a triangular wave, of amplitude representing the length of the time axis of the oscilloscope, means for applying the triangular wave to the sweep deflection circuit of the oscilloscope, and means for applying a substantially fixed voltage synchronized with said rectangular wave to the beam-brightness determining electrode of the oscilloscope.

12. A sweep wave generator combination for an oscilloscope having a sweep deflecting circuit for the oscilloscope beam, and an electrode for determining the brightness of the oscilloscope beam, said sweep wave generator combination comprising means for producing a triangular sweep wave with the portion of one slope steeper than the portion having the slope of opposite polarity and being referred to as the return portion, means for synchronizing the triangular wave with a voltage which is in synchronism with the signal wave to be examined in the oscilloscope, and means for supplying a supplementary voltage to the beam-brightness determining electrode of the oscilloscope during the return portion of the triangular wave, for maintaining a predetermined relationship between the beam brightness during the return interval of the beam and the beam brightness during the advancing portion of the sweep wave.

13. A sweep wave generator combination for an oscilloscope having a sweep deflecting circuit for the oscilloscope beam, and an electrode for determining the brightness of the oscilloscope beam, said sweep wave generator combination comprising means for producing a triangular sweep wave having a return portion which is shorter than the forward portion, the triangular wave having an amplitude representing the length of the time axis of the oscilloscope, means for synchronizing the triangular wave with a voltage which is in synchronism with the signal wave to be examined in the oscilloscope, means for varying the phase relationship of the triangular wave with the signal to be examined, and means for supplying a voltage to the beam-brightness determining electrode of the oscilloscope during the return portion of the triangular wave, whereby the beam brightness during the return interval of the beam is brought to the desired value in relation to the brightness during the advancing portion of the sweep wave, and the beam produces in reverse an expansion of a portion of the signal wave.

14. In a sweep wave generator for an oscilloscope having a sweep deflecting circuit for the oscilloscope beam and an elctrode for determining the brightness of the oscilloscope beam, said sweep wave generator comprising means for producing a sweep wave with forward and retrace portions, the sweep wave having an amplitude representing the length of the time axis of the oscilloscope, the combination with said brightness determining electrode of means for supplying a substantially fixed voltage thereto during one of said portions of the sweep wave for maintaining a predetermined relationship between the beam brightness during the forward and retrace intervals of the sweep wave.

15. In a sweep wave generator for an oscilloscope having a sweep deflecting circuit for the oscilloscope beam and an electrode for determining the brightness of the oscilloscope beam, said sweep wave generator comprising means for producing a sweep wave including portions of different steepness, one of said portions having relatively great steepness and having an amplitude representing the length of the time axis of the oscilloscope, the combination with said brightness determining electrode of means for supplying a substantially fixed voltage thereto during said relatively steep portion of the sweep wave for maintaining a predetermined relationship between the beam brightness during said portion of the sweep wave and the brightness during another portion of the sweep wave.

16. In a sweep wave generator for an oscilloscope having a sweep deflecting circuit for the oscilloscope beam and an electrode for determining the brightness of the oscilloscope beam, said sweep wave generator comprising means for producing a sweep wave including a portion of increased steepness for expanding a portion of the signal wave to be examined in the oscilloscope and of an amplitude representing the length of the time axis of the oscilloscope, the combination with said brightness determining electrode of means for supplying a substantially fixed voltage thereto during the said steeper portion of the sweep wave for maintaining a predetermined relationship between the beam hightness during the expansion interval of the sweep wave and the remainder of the sweep wave.

HARRIS A. THOMPSON.